United States Patent
Ota et al.

(10) Patent No.: US 11,110,884 B2
(45) Date of Patent: Sep. 7, 2021

(54) SIDE AIRBAG APPARATUS

(71) Applicant: TOYODA GOSEI CO., LTD., Kiyosu (JP)

(72) Inventors: Shohei Ota, Kiyosu (JP); Koji Shibayama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 175 days.

(21) Appl. No.: 16/576,188

(22) Filed: Sep. 19, 2019

(65) Prior Publication Data

US 2020/0094769 A1    Mar. 26, 2020

(30) Foreign Application Priority Data

Sep. 26, 2018   (JP) .............................. JP2018-180124

(51) Int. Cl.
| | | |
|---|---|---|
| *B60R 21/237* | (2006.01) | |
| *B60R 21/231* | (2011.01) | |
| *B60R 21/207* | (2006.01) | |

(52) U.S. Cl.
CPC .......... *B60R 21/237* (2013.01); *B60R 21/207* (2013.01); *B60R 21/23138* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 6,142,507 A | * | 11/2000 | Okuda | B60R 21/23138 280/730.2 |
| 6,231,070 B1 | * | 5/2001 | Sunabashiri | B60R 21/237 280/730.2 |
| 9,238,446 B2 | * | 1/2016 | Azuma | B60R 21/237 |
| 2013/0079208 A1 | * | 3/2013 | Wiik | B60R 21/237 493/405 |
| 2014/0300089 A1 | | 10/2014 | Azuma et al. | |
| 2015/0183393 A1 | | 7/2015 | Kino et al. | |

FOREIGN PATENT DOCUMENTS

| | | | |
|---|---|---|---|
| JP | 10181496 A | * | 7/1998 |
| JP | 5848091 B2 | | 1/2016 |
| JP | 6067490 B2 | | 1/2017 |
| JP | 2017-081307 A | | 5/2017 |
| JP | 6222008 B2 | | 11/2017 |

* cited by examiner

*Primary Examiner* — Faye M Fleming
(74) *Attorney, Agent, or Firm* — Posz Law Group, PLC (57) ABSTRACT

A side airbag apparatus includes a side airbag housed in a seat back of a seat of a vehicle. The side airbag includes a lower protection portion configured to protect a portion below a head portion of the occupant, and an upper protection portion configured to protect the head portion. The side airbag is folded in a state in which the upper protection portion is folded toward a lower side so as to be positioned on an outer side in a width direction of the vehicle with respect to the lower protection portion, and a portion, that protrudes toward the front side with respect to the lower protection portion, of the upper protection portion folded toward the lower side, is folded toward a rear side so as to be positioned on an inner side in the width direction with respect to the lower protection portion.

5 Claims, 9 Drawing Sheets

SIDE AIRBAG APPARATUS

CROSS-REFERENCE TO RELATED APPLICATIONS

This application is based upon and claims the benefit of priority from prior Japanese patent application No. 2018-180124, filed on Sep. 26, 2018, the entire contents of which are incorporated herein by reference.

TECHNICAL FIELD

The present invention relates to a side airbag apparatus.

BACKGROUND ART

A side airbag apparatus mounted on a vehicle such as an automobile includes an airbag (a side airbag) that is housed in a seat back on a seat of a vehicle in a state such that the airbag is folded to have a reduced width in a front-rear direction of the vehicle. The apparatus supplies gas to the airbag upon side collision or the like of the vehicle, thereby deploying and inflating the airbag from the seat back toward a front side of the vehicle and between an occupant seated on the seat and a body side portion of the vehicle.

Incidentally, as a method of folding the airbag when the airbag is housed in the seat back, for example, as disclosed in JP-A-2017-81307, it is conceivable to adopt a folding method in which an airbag in a deployed and inflated state is folded so as to fall outward in a width direction of the vehicle at a plurality of positions between a front side and a rear side of the vehicle.

However, when trying to protect a head portion of the occupant as well as a portion below the head portion of the occupant with the deployed and inflated airbag, since a portion for protecting the head portion thereof (hereinafter, referred to as an upper protection portion) is provided, size increase of the airbag cannot be prevented. Further, the above-described airbag apparatus may also be applied to a vehicle in which a gap between a seat back of a seat and a body side portion is narrow. In this case, when the airbag is deployed and inflated between the seat back and the body side portion, a folded portion of the airbag is strongly pressed against the body side portion by an initially inflated portion of the airbag, so that the folded portion (such as the upper protection portion) may not be appropriately deployed.

It is an object of the present invention to provide a side airbag apparatus in which a side airbag, which includes an upper protection portion for protecting a head portion of an occupant seated on a seat, can be preferably deployed and inflated.

SUMMARY OF INVENTION

According to an aspect of the invention, there is provided a side airbag apparatus comprising: a side airbag housed in a seat back of a seat of a vehicle in a state such that the side airbag is folded to have a reduced width in a front-rear direction of the vehicle, the side airbag configured to, when supplied with gas, be deployed and inflated toward a front side of the vehicle between an occupant seated on the seat and a body side portion of the vehicle, wherein the side airbag includes: a lower protection portion configured to protect a portion below a head portion of the occupant when the side airbag is deployed and inflated; and an upper protection portion positioned above the lower protection portion, protruding toward the front side of the vehicle than the lower protection portion, and configured to protect the head portion of the occupant, when the side airbag is deployed and inflated, and wherein the side airbag is folded so as to have the reduced width in the front-rear direction of the vehicle and housed in the seat back, in a state in which the upper protection portion is folded toward a lower side so as to be positioned on an outer side in a width direction of the vehicle with respect to the lower protection portion, and a portion, that protrudes toward the front side of the vehicle with respect to the lower protection portion, of the upper protection portion folded toward the lower side, is folded toward a rear side of the vehicle so as to be positioned on an inner side in the width direction of the vehicle with respect to the lower protection portion.

DESCRIPTION OF EMBODIMENTS

Hereinafter, an embodiment of a side airbag apparatus applied to a vehicle such as an automobile will be described with reference to FIGS. 1 to 17.

Figure 1:
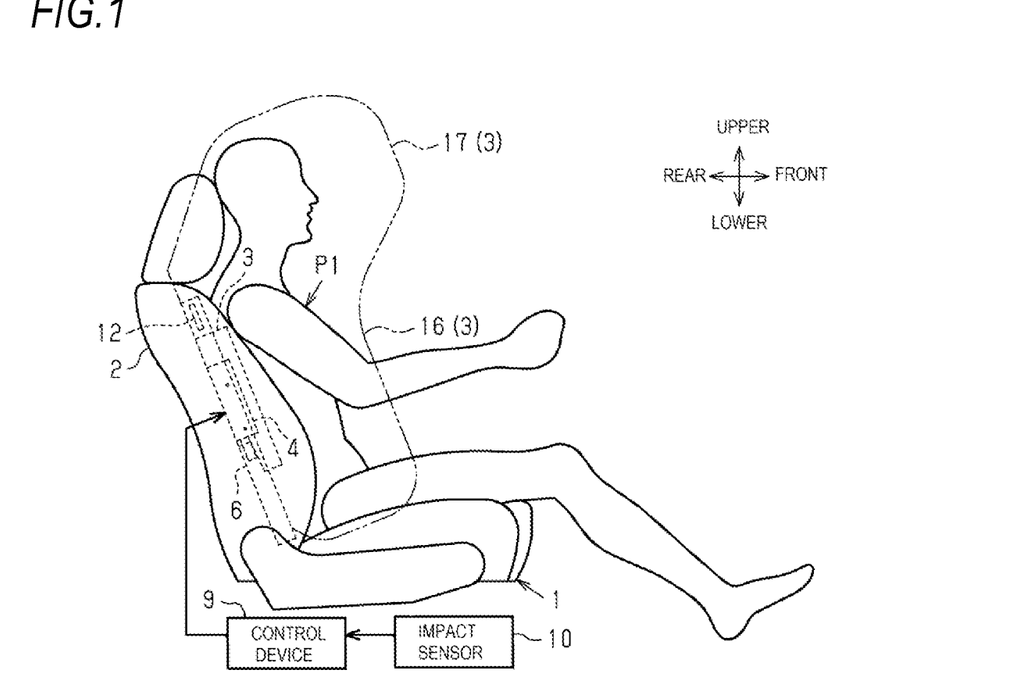
FIG. 1 is a side view showing an entire side airbag apparatus.

As shown in FIG. 1, the side airbag apparatus includes an airbag (side airbag) 3 housed in a folded state inside a seat back 2 of a seat 1 of a vehicle, and an inflator 4 that supplies an inflating gas to the airbag 3. The inflator 4, together with the airbag 3, is fixed to a frame 6 extending inside the seat back 2 in a substantially upper-lower direction along the seat back 2. A bracket 12 that guides a belt, through which a seat belt is inserted, is attached to a portion, that is above the inflator 4, of an upper portion of the frame 6.

In the airbag 3 of FIG. 1, a state in which the airbag 3 is folded and housed in the seat back 2 is shown by a broken line, and a state in which the airbag 3 receives the inflating gas supplied from the inflator 4, and is deployed and inflated, is shown by a two-dot chain line.

Figure 2:
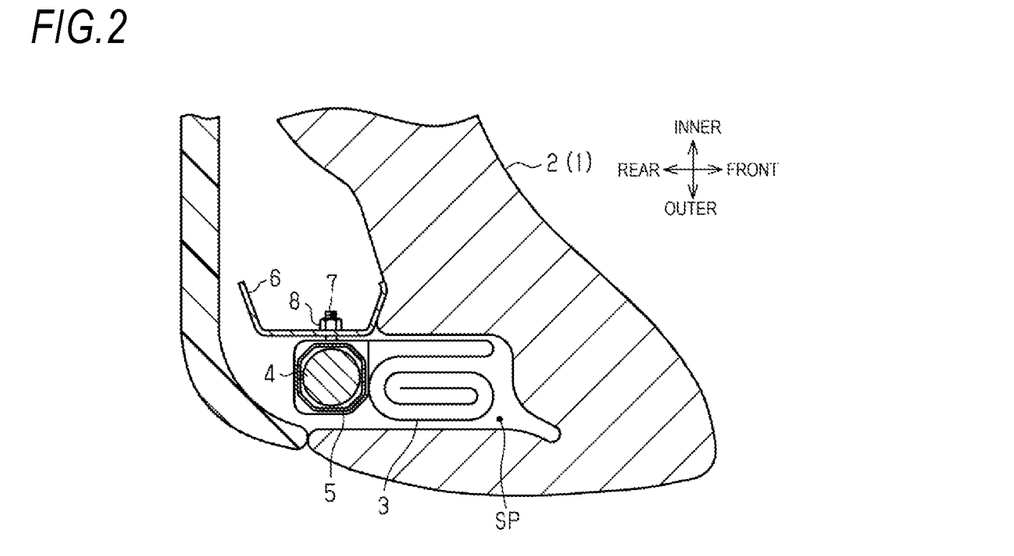
FIG. 2 is an enlarged cross-sectional view showing a periphery of an airbag inside a seat back.

FIG. 2 shows a periphery of the airbag 3 inside the seat back 2. As can be seen from FIG. 2, the inflator 4 housed inside the seat back 2 is fixed, by crimping or the like, to a retainer 5 that covers the periphery of the inflator 4. Further, the retainer 5 is fixed to the frame 6 together with the airbag 3 in the above-described folded state by a bolt 7 and a nut 8 provided on each of two stages, including an upper stage and a lower stage (only the upper stage is shown in FIG. 2). Thus, the inflator 4 is fixed to the frame 6 of the seat back 2 via the retainer 5, and the airbag 3 is also fixed to the frame 6.

As shown in FIG. 1, the side airbag apparatus also includes a control apparatus 9 that controls supply of the inflating gas to the airbag 3 from the inflator 4, and an impact sensor 10 that detects a side collision of the vehicle. When an impact based on a side collision is applied to the vehicle, the impact sensor 10 outputs a detection signal to the control apparatus 9. The control apparatus 9, on the basis of the detection signal from the impact sensor 10, operates the inflator 4 to supply the inflating gas to the airbag 3.

Then, when the inflating gas is supplied from the inflator 4 to the airbag 3 in the folded state, the airbag 3 is deployed and inflated, and is popped out toward the front side (a right side in FIG. 1) from the seat back 2 while leaving a portion in the vicinity of the inflator 4 inside the seat back 2. Incidentally, a size of the airbag 3 deployed and inflated as shown by the two-dot chain line in FIG. 1 is capable of not only protecting a portion below a head portion of an occupant P1, but also protecting the head portion of the occupant P1.

Figure 3:
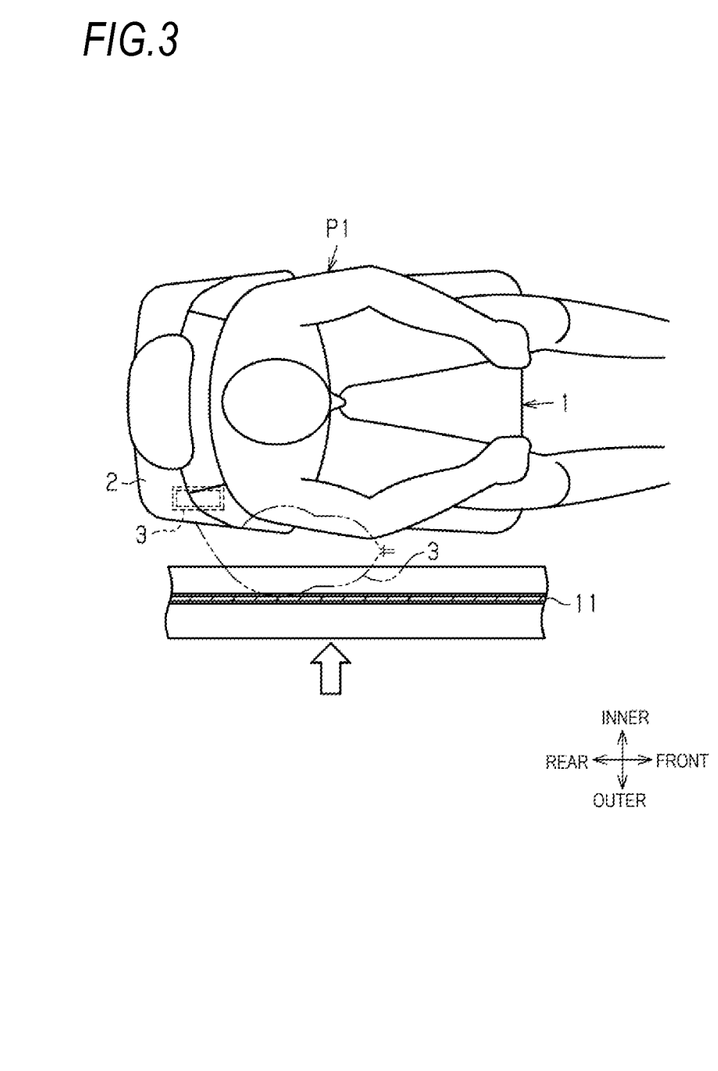
FIG. 3 is a plan view showing a positional relationship between a seat and a body side portion in a vehicle.

As shown by a two-dot chain line in FIG. 3, the airbag 3 popped out from the seat back 2 as described above is deployed and inflated toward the front of the vehicle (a right side in FIG. 3) between the occupant P1 seated on the seat 1 and a body side portion 11 such as a door and a pillar of the vehicle. An outline arrow in FIG. 3 shows a direction in which an impact is applied when the impact is applied to the body side portion 11 due to a side collision of the vehicle.

Next, the airbag 3 will be described in detail.

Figure 4:
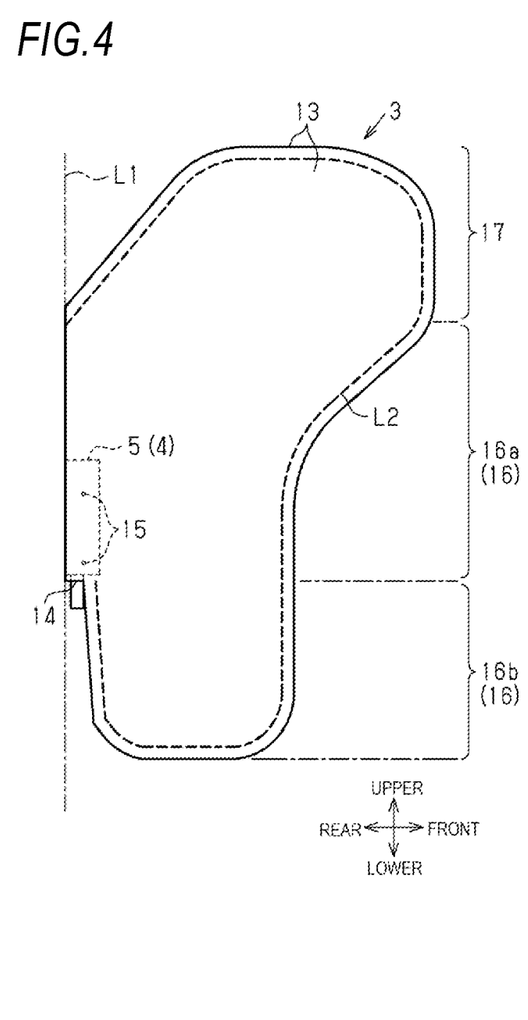
FIG. 4 is a side view showing a state in which the airbag is deployed.

As shown in FIG. 4, the airbag 3 is formed into a bag shape, by folding one piece of fabric piece 13 into two along a folding line L1, overlapping the fabric piece 13 with itself in the thickness direction, and joining peripheries of overlapped portions to each other at a position shown by a thick broken line L2. On a portion, that is in the vicinity of the folding line L1, of a lower portion of the airbag 3, an opening 14 communicating an inside and an outside of the airbag 3 is formed on a portion where the fabric piece 13 is not joined to itself (a portion other than the thick broken line L2). The retainer 5 (the inflator 4) can be inserted into the airbag 3 through the opening 14.

In addition, on one of the portions that are folded into two at the folding line L1 on the fabric piece 13 and that are overlapped with each other in the thickness direction, a pair of upper and lower attachment holes 15 are formed on a portion positioned above the opening 14 in FIG. 4. The attachment holes 15 attach a rear end portion (a left end portion in FIG. 4) of the airbag 3 to the frame 6 (FIG. 2) of the seat back 2. That is, in a state in which the retainer 5 is inserted into the airbag 3, the bolts 7 that fix the retainer 5 to the frame 6 (FIG. 2) are respectively passed through the attachment holes 15 (FIG. 4) of the fabric piece 13, and the airbag 3 is fixed to the frame 6 together with the retainer 5 by using the bolts 7 and the nuts 8 (FIG. 2). Fixing of the airbag 3 to the frame 6 is performed so that a portion, that is away from the retainer 5, of the airbag 3, is positioned on the front side of the vehicle (a right side in FIG. 4).

The airbag 3 includes: a lower protection portion 16 that protects the portion below the head portion of the occupant when the airbag 3 is deployed and inflated; and an upper protection portion 17 that is positioned above the lower protection portion 16, that protrudes toward the front side of the vehicle with respect to the lower protection portion 16, and that protects the head portion of the occupant, when the airbag 3 is deployed and inflated. The lower protection portion 16 has: an initial inflation area 16a on which the opening 14 and the attachment holes 15 are formed; and a lower inflation area 16b positioned below the initial inflation area 16a. The airbag 3 is folded from an unfolded state as shown in FIG. 4, and is housed inside the seat back 2 in the folded state. Hereinafter, folding procedures of the airbag 3 for housing the airbag 3 inside the seat back 2 will be described in detail.

(Procedure 1)

Figure 5A:
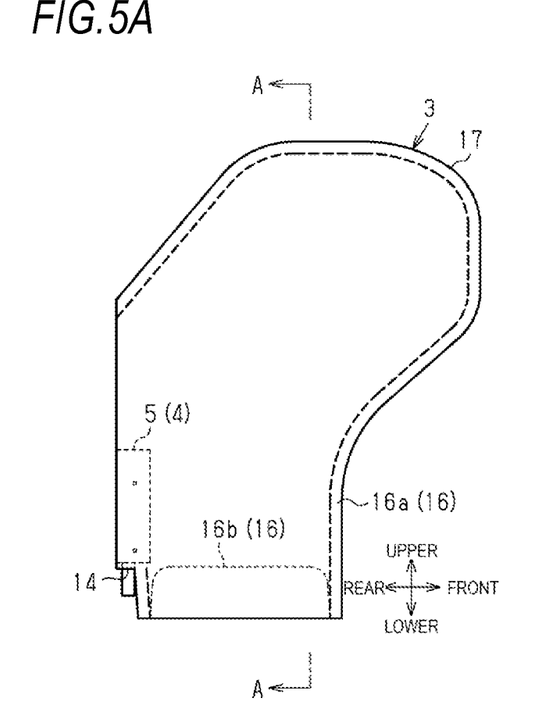
FIGS. 5A and 5B are a side view and a cross-sectional view showing the airbag when a procedure 1 for folding the airbag is performed.
Figure 5B:
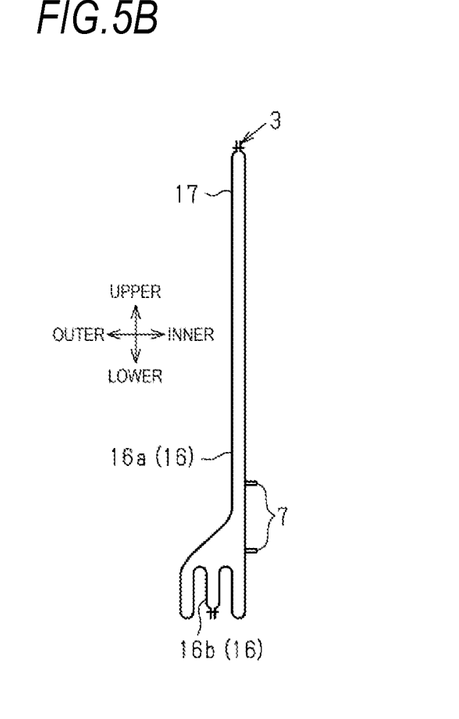

As shown in FIG. 4, the retainer 5 and the inflator 4 are inserted into the initial inflation area 16a of the lower protection portion 16 of the airbag 3 through the opening 14. The bolts 7 of the retainer 5 inserted into an inner peripheral portion of the initial inflation area 16a are inserted into the attachment holes 15 formed on the initial inflation area 16a. In this state, as shown in FIGS. 5A and 5B, the lower inflation area 16b of the lower protection portion 16 is folded inward so as to be recessed toward the inside of the airbag 3 (an upper side in FIG. 4). FIG. 5B shows a state in which the airbag 3 in FIG. 5A is viewed from a direction of arrows A-A.

(Procedure 2)

Figure 6A:
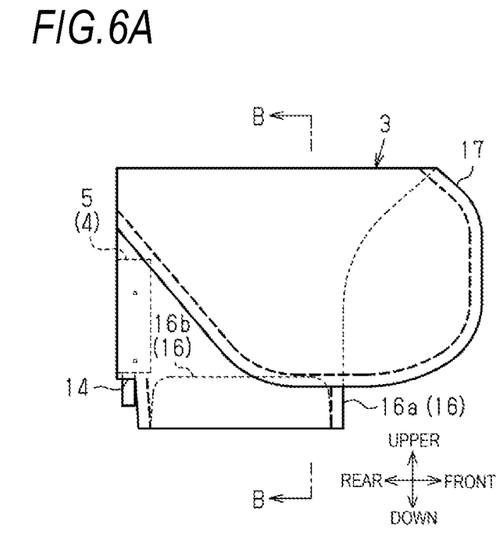
FIGS. 6A and 6B are a side view and a cross-sectional view showing the airbag when a procedure 2 for folding the airbag is performed.
Figure 6B:
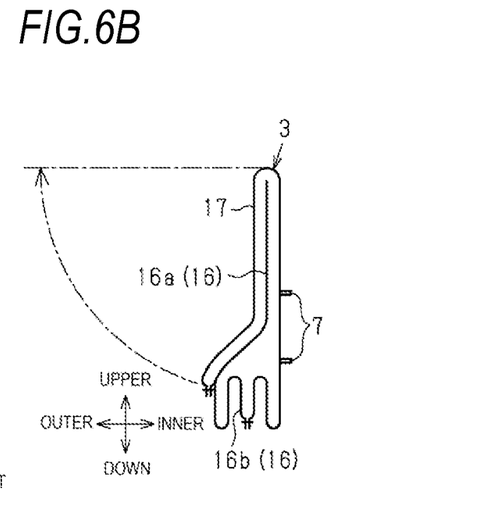

After the procedure 1 is performed, as shown in FIGS. 6A and 6B, the upper protection portion 17 of the airbag 3 is folded toward the lower side so as to be positioned on an outer side in a width direction of the vehicle (a left side in FIG. 6B) with respect to the lower protection portion 16. FIG. 6B shows a state in which the airbag 3 in FIG. 6A is viewed from a direction of arrows B-B. At this time, a front end portion (a right end portion in FIG. 6A) of the upper protection portion 17 folded toward the lower side protrudes to the front side of the vehicle (the right side in FIG. 6A) with respect to the lower protection portion 16.

(Procedure 3)

Figure 7A:
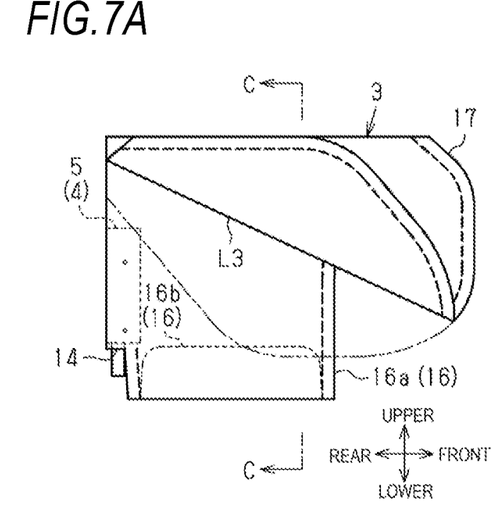
FIGS. 7A and 7B are a side view and a cross-sectional view showing the airbag when a procedure 3 for folding the airbag is performed.
Figure 7B:
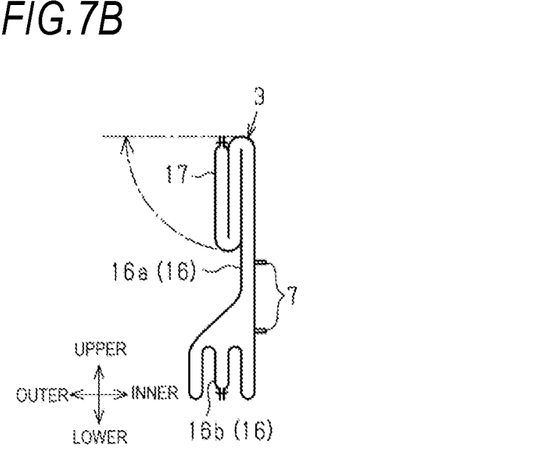

The upper protection portion 17 folded toward the lower side in the procedure 2 (FIG. 6A) is folded back toward the upper side so that the lower end portion of the upper protection portion 17 does not protrude toward the upper side from an upper end portion of the lower protection portion 16, as shown in FIGS. 7A and 7B. More specifically, the lower end portion of the upper protection portion 17 is folded back toward the upper side along a fold L3, that is inclined with respect to a horizontal plane so as to be positioned on the lower side of the vehicle toward the front side of the vehicle (a right side in FIG. 7A). FIG. 7B shows a state in which the airbag 3 in FIG. 7A is viewed from a direction of arrows C-C.

(Procedure 4)

Figure 8A:
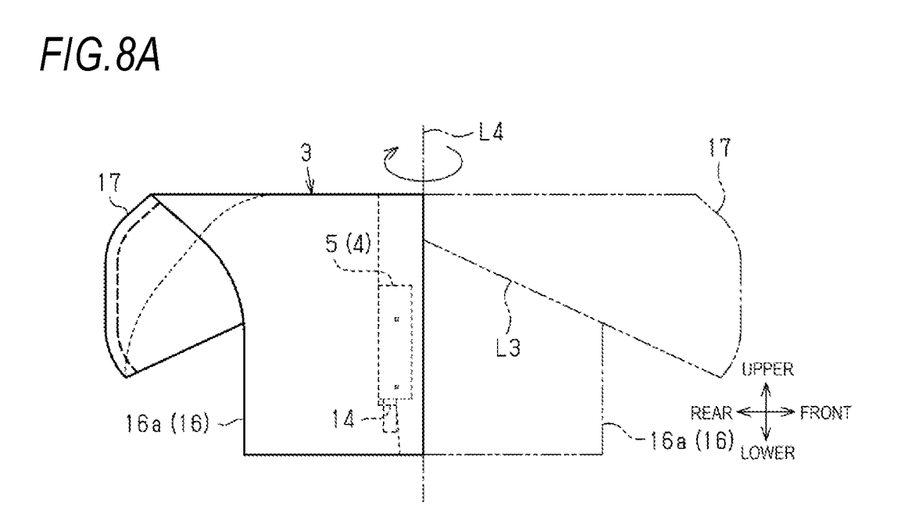
FIGS. 8A and 8B are a side view and a bottom view showing the airbag when a procedure 4 for folding the airbag is performed.
Figure 8B:
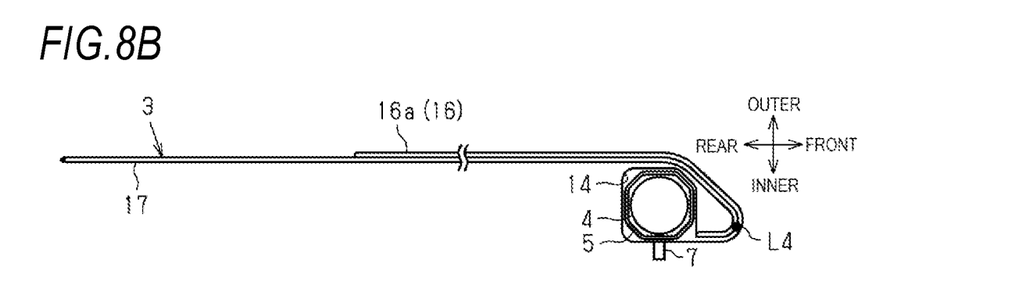

Then, as shown in FIGS. 8A and 8B, the airbag 3 (the lower protection portion 16 and the upper protection portion 17) is folded back toward the rear side of the vehicle (a left side in FIG. 8A) so as to fall outward in the width direction of the vehicle (upward in FIG. 8B) along a folding line L4 extending in the upper-lower direction in the vicinity of the retainer 5. FIG. 8B shows a state in which the airbag 3 in FIG. 8A is viewed from the lower side.

(Procedure 5)

Figure 9A:
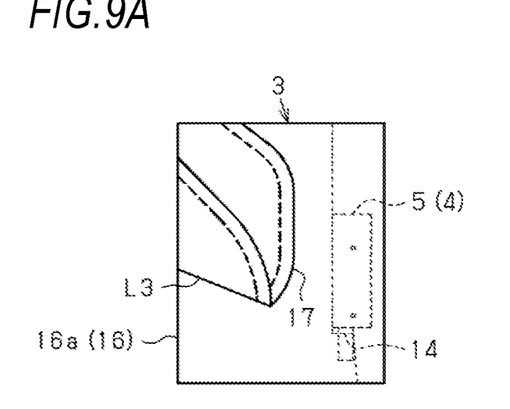
FIGS. 9A and 9B are a side view and a bottom view showing the airbag when a procedure 5 for folding the airbag is performed.
Figure 9B:
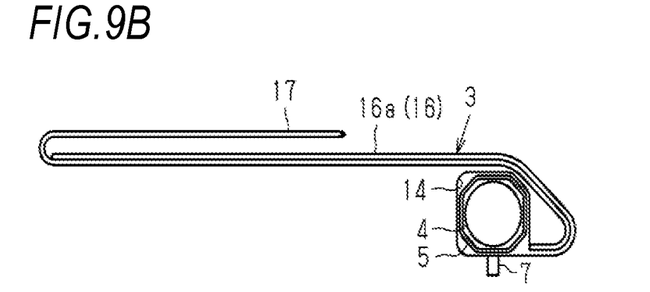

Further, a portion, that protrudes toward a left side in FIG. 8A with respect to the lower protection portion 16, of the upper protection portion 17, is folded toward a side opposite to the lower protection portion 16 on the upper protection portion 17, so as to fall toward a right side in FIGS. 9A and 9B. FIG. 9B shows a state in which the airbag 3 in FIG. 9A is viewed from the lower side.

Figures 10A, 10B:
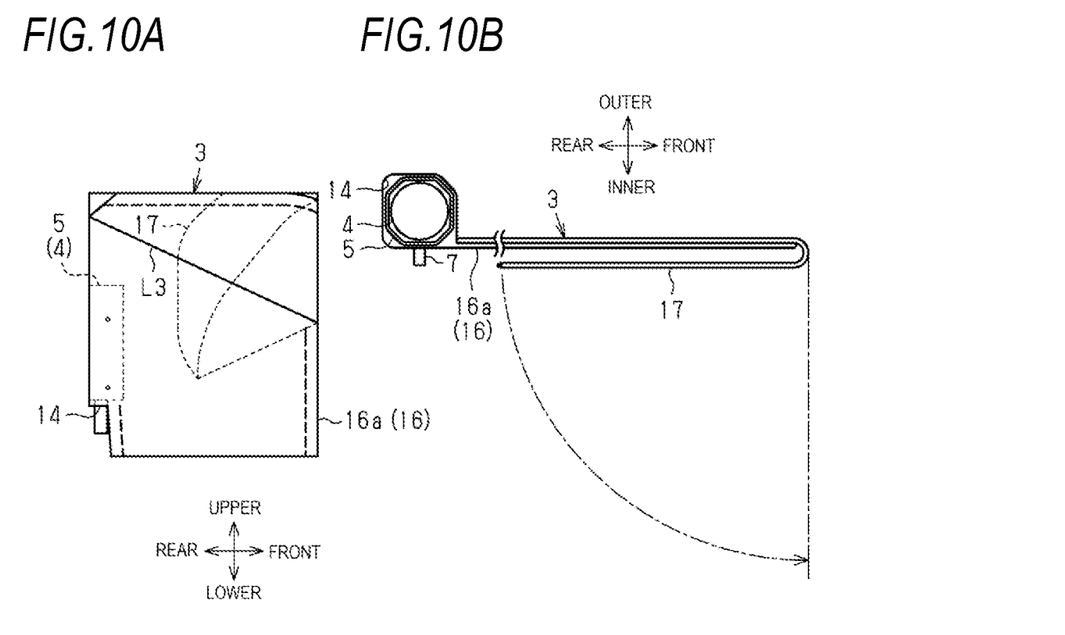
FIGS. 10A and 10B are a side view and a bottom view of the airbag showing a folding mode of the airbag in the procedure 5, assuming that folding back in the procedure 4 is not performed.

Incidentally, if the airbag 3 folded as shown in FIG. 9A is not folded back along the folding line L4 in the procedure 4, the folded airbag 3 can also be modified as being folded as follows in the procedure 5. That is, a portion, that protrudes toward the front side of the vehicle with respect to the lower protection portion 16, of the upper protection portion 17, as shown in FIG. 7A, is folded toward the rear side of the vehicle (a left side in FIG. 10B) so as to be positioned on the inner side in the width direction of the vehicle (a lower side in FIG. 10B) with respect to the lower protection portion 16, as shown by a broken line in FIG. 10A and a solid line in FIG. 10B. FIG. 10B shows a state in which the airbag 3 in FIG. 10A is viewed from the lower side.

(Procedure 6)

Figure 11A:
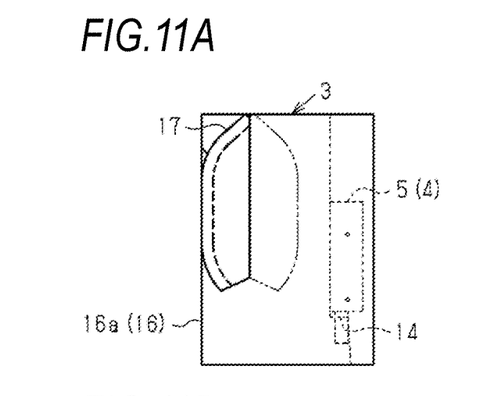
FIGS. 11A and 11B are a side view and a bottom view showing the airbag when a procedure 6 for folding the airbag is performed.
Figure 11B:
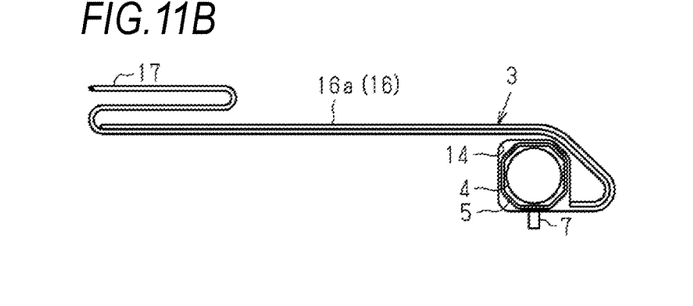

As shown in FIGS. 11A and 11B, a right end portion of a portion of the upper protection portion 17, that is folded so as to fall toward the right side in FIGS. 9A and 9B in the procedure 5, is folded back toward the left side, so as not to protrude toward the left side from a left end portion of the lower protection portion 16. FIG. 11B shows a state in which the airbag 3 in FIG. 11A is viewed from the lower side.

Figure 12A:
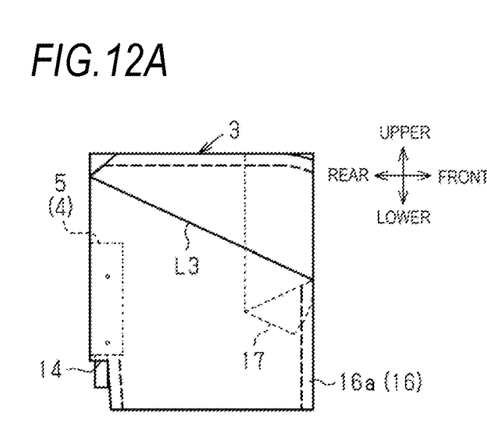
FIGS. 12A and 12B are a side view and a bottom view of the airbag showing a folding mode of the airbag in the procedure 6, assuming that folding back in the procedure 4 is not performed.
Figure 12B:
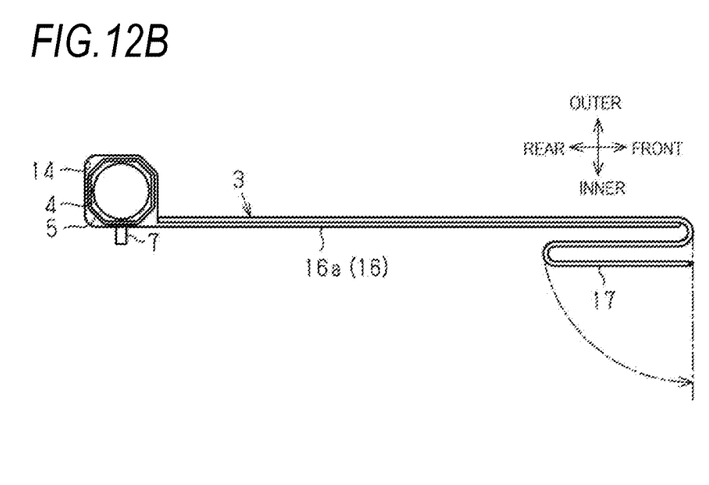

Incidentally, if the airbag 3 folded as shown in FIGS. 11A and 11B is not folded back along the folding line L4 in the procedure 4, the airbag 3 can also be modified as being folded follows in the procedure 6. That is, a rear end portion (a left end portion in FIG. 10B) of a portion, that is folded toward the rear side of the vehicle so as to be positioned on the inner side in the width direction of the vehicle (the lower side in FIG. 10B) with respect to the lower protection portion 16, of the upper protection portion 17 shown in FIG. 10, is folded back toward the front side so as not to protrude toward the front side from the front end of the lower protection portion 16, as shown by a broken line in FIG. 12A and a solid line in FIG. 12B. FIG. 12B shows a state in which the airbag 3 in FIG. 12A is viewed from the lower side.

(Procedure 7)

Figure 13:
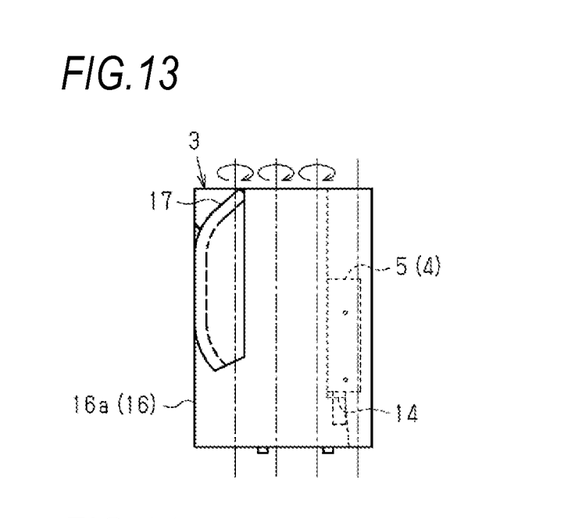
FIG. 13 is a side view showing the airbag when a procedure 7 for folding the airbag is performed.
Figure 14:
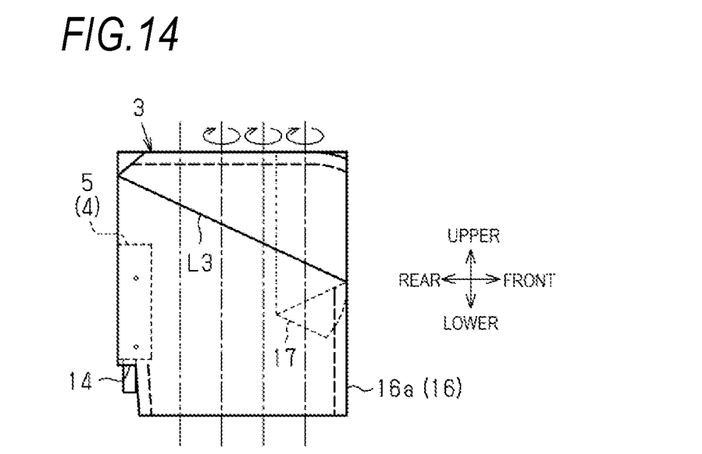
FIG. 14 is a side view of the airbag showing a folding mode of the airbag in the procedure 7, assuming that folding back in the procedure 4 is not performed.

Thereafter, the airbag 3 is folded into a flat roll shape as shown by arrows in FIG. 13. If the airbag 3 folded in this way is not folded back along the folding line L4 in the procedure 4, the airbag 3 can also be modified as being folded into a flat roll shape as follows in the procedure 7. That is, as shown by arrows in FIG. 14, the airbag 3 shown in FIG. 12A is folded into a flat roll shape from the front side (a right side in FIG. 14) toward the rear side (a left side in FIG. 14) of the vehicle.

(Procedure 8)

Figure 15A:
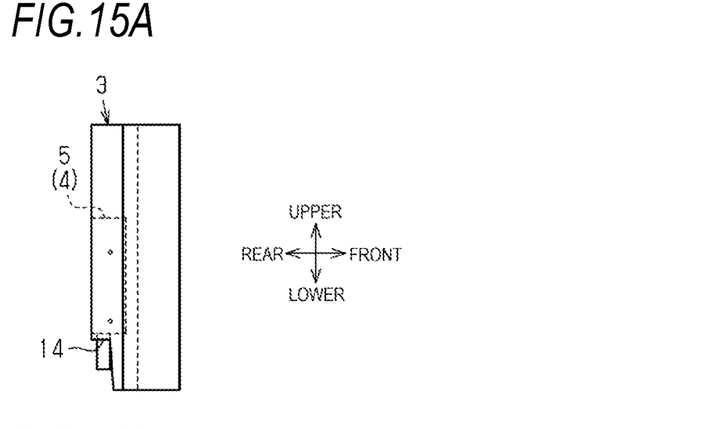
FIGS. 15A and 15B are a side view and a bottom view showing the airbag when a procedure 8 for folding the airbag is performed.
Figure 15B:
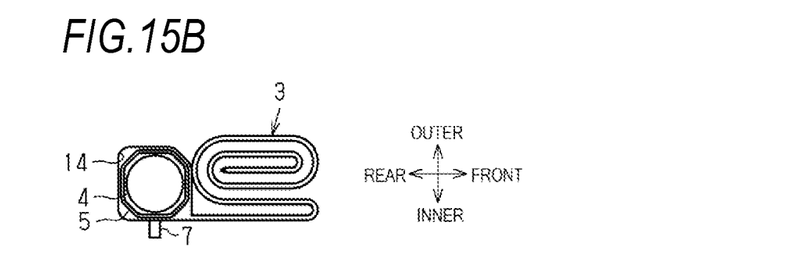

Further, in the airbag 3, a portion closer to the retainer 5 than a portion, that is folded into the flat roll shape as described above, is folded back in the front-rear direction of the vehicle so as to be folded in a bellows-shaped manner. The airbag 3 at this time is shown in FIGS. 15A and 15B. FIG. 15B shows a state in which the airbag 3 in FIG. 15A is viewed from the lower side. By folding the airbag 3 into the flat roll shape as in the procedure 7 described above and folding the airbag 3 in the bellows-shaped manner as in the procedure 8, the airbag 3 has a reduced width in the front-rear direction of the vehicle (left-right directions in FIGS. 15A and 15B).

The airbag 3 folded through the procedures 1 to 8 as described above is housed in the seat back 2 in a manner that a portion, that is folded into the flat roll shape as shown in FIG. 2, of the airbag 3, becomes thinner in the width direction of the vehicle (an upper-lower direction in FIG. 2), and is fixed to the frame 6 of the seat back 2 together with the retainer 5 using the bolts 7 and the nuts 8.

Next, operation of the side airbag apparatus will be described.

When an impact based on a side collision is applied to the vehicle, the inflating gas from the inflator 4 is supplied with respect to the airbag 3 folded inside the seat back 2 of the seat 1 (FIG. 2), and thus the airbag 3 starts to be deployed and inflated. In an initial stage of the deployment and inflation of the airbag 3, the portion, that is folded so as to have a reduced width in the front-rear direction of the vehicle, of the airbag 3, i.e., the portion folded in the bellows-shaped manner and the portion folded into the flat roll shape, extend in the front-rear direction of the vehicle.

Figure 16:
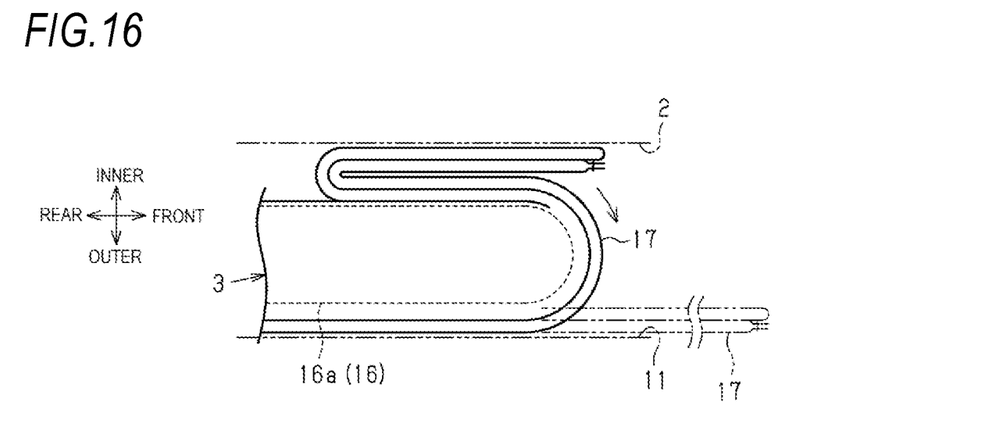
FIG. 16 is a plan view schematically showing a state in which an end portion on a front side of the vehicle, of the airbag in a process of deployment and inflation, is viewed from above.

FIG. 16 shows a state in which, in the initial stage of deployment and inflation, the portion folded in the bellows-shaped manner and the portion folded into the flat roll shape of the airbag 3 extend from the rear side toward the front side of the vehicle, and in which a tip end of an extended portion is viewed from above. At this time, when the lower protection portion 16 into which the inflator 4 is inserted is inflated by the inflating gas, the lower inflation area 16b (FIG. 5) of the lower protection portion 16 accordingly extends so as to be popped out from the initial inflation area 16a toward the lower side.

When the airbag 3 is in the state as shown in FIG. 16, the upper protection portion 17 of the airbag 3 is positioned so as to wrap around the lower protection portion 16 in the horizontal direction from the outer side (a lower side in FIG. 16) to the inner side (an upper side in FIG. 16) in the vehicle width direction of the vehicle. Thereafter, when the lower protection portion 16 of the airbag 3 is inflated in accordance with supply of the inflating gas from the inflator 4, the upper protection portion 17 is pressed against the body side portion 11 of the vehicle and the seat back 2 of the seat 1 by the lower protection portion 16 between the body side portion 11 and the seat back 2.

However, at this time, in accordance with inflation of the lower protection portion 16, the portion, that is positioned on the outer side in the width direction of the vehicle than the lower protection portion 16, of the upper protection portion 17, draws the portion, that is positioned on the inner side in the width direction of the vehicle than the lower protection portion 16, of the upper protection portion 17, in a direction drawing out from between the lower protection portion 16 and the seat back 2 (an arrow direction in FIG. 16). Thus, as shown by two-dot chain lines in FIG. 16, the portion, that is positioned on the inner side in the width direction of the vehicle than the lower protection portion 16, of the upper protection portion 17, is drawn toward the front side (a right side in FIG. 16) from between the lower protection portion 16 and the seat back 2. Therefore, the portion, that is positioned on the inner side in the width direction of the vehicle than the lower protection portion 16, of the upper protection portion 17, does not become incapable of being deployed and inflated due to being pressed against the seat back 2 by the lower protection portion 16.

Figure 17:
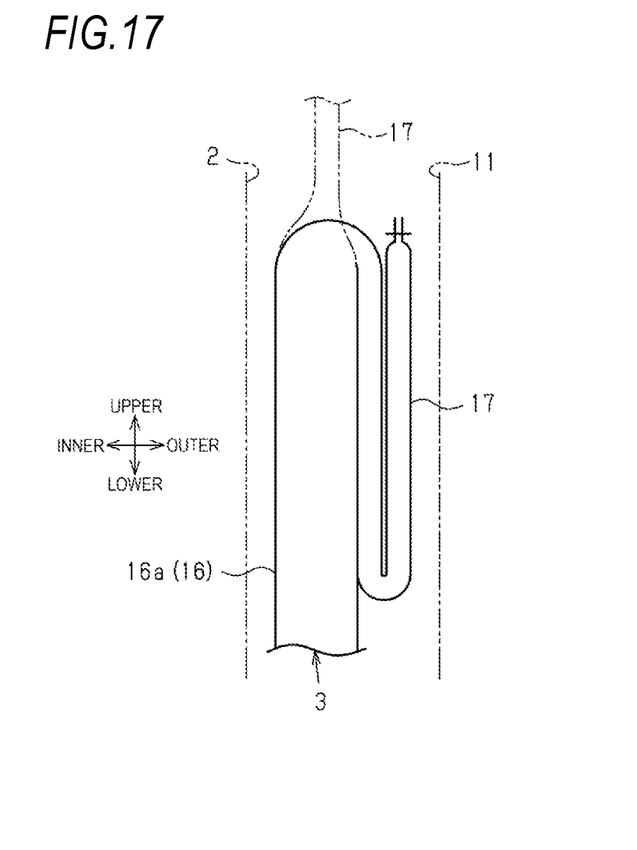
FIG. 17 is a rear view schematically showing a state in which the airbag in the process of deployment and inflation is viewed from a rear side of the vehicle.

FIG. 17 shows a state in which the airbag 3, in which the upper protection portion 17 is displaced as shown by the two-dot chain lines in FIG. 16, is viewed from the rear side of the vehicle. When the lower protection portion 16 in FIG. 17 is inflated, the portion, that is positioned on the outer side in the width direction of the vehicle (a right side in FIG. 17) than the lower protection portion 16, of the upper protection portion 17, is drawn toward the upper side from between the lower protection portion 16 and the body side portion 11 due to inflation of the lower protection portion 16 as shown by two-dot chain lines in FIG. 17. Therefore, the portion, that is positioned on the outer side in the width direction of the vehicle than the lower protection portion 16, of the upper protection portion 17, does not become incapable of being deployed and inflated due to being pressed against the body side portion 11 by the lower protection portion 16. The airbag 3 deployed and inflated as shown by the two-dot chain lines in FIG. 1 protects the head portion and the portion below the head portion of the occupant P1 from the impact based on the side collision.

As described above, when the airbag 3 is deployed and inflated, even if the upper protection portion 17 is pressed against the seat back 2 and the body side portion 11 by the inflated lower protection portion 16, the upper protection portion 17 does not become incapable of being deployed. Therefore, the lower protection portion 16 and the upper protection portion 17 of the airbag 3 can be appropriately deployed and inflated, the head portion of the occupant P1 seated on the seat 1 can be protected by the upper protection portion 17 of the airbag 3, and the portion below the head portion of the occupant P1 can be protected by the lower protection portion 16 of the airbag 3.

According to the present embodiment described above in detail, the following effects can be obtained.

(1) The airbag 3, which includes the upper protection portion 17 for protecting the head portion of the occupant P1 seated on the seat 1, can be preferably deployed and inflated.

(2) As shown in FIG. 17, when the portion, that is positioned on the outer side in the width direction of the vehicle than the lower protection portion 16, of the upper protection portion 17 of the airbag 3, is drawn toward the upper side from between the lower protection portion 16 and the body side portion 11 due to inflation of the lower protection portion 16, the upper protection portion 17 tends to rotate (to be deployed) toward the upper side about a border portion between the upper protection portion 17 and the lower protection portion 16 (the upper end portion of the lower protection portion 16).

The upper protection portion 17 is folded toward the lower side with respect to the lower protection portion 16, and the lower end portion of the folded portion of the upper protection portion 17 is folded back toward the upper side. Therefore, the width of the upper protection portion 17 in the upper-lower direction can be reduced, and the rotation trajectory when the upper protection portion 17 rotates as described above is kept small.

Incidentally, as shown in FIG. 6B, when the upper protection portion 17 is rotated as described above in a state in which the upper protection portion 17 is only folded toward the lower side with respect to the lower protection portion 16, the rotation trajectory at that time is enlarged as shown by a two-dot chain line. On the other hand, as in the present embodiment, in a case in which the upper protection portion 17 is folded toward the lower side with respect to the lower protection portion 16, and then the lower end portion of the folded portion of the upper protection portion 17 is folded back toward the upper side, the rotation trajectory when the upper protection portion 17 rotates as described above is kept small as shown by a two-dot chain line in FIG. 7B.

Therefore, when the portion, that is positioned on the outer side in the width direction of the vehicle than the lower protection portion 16, of the upper protection portion 17 of the airbag 3, is drawn toward the upper side from between the lower protection portion 16 and the body side portion 11 due to inflation of the lower protection portion 16, the action can be performed easily.

(3) As shown in FIG. 1, in the vehicle seat 1, the bracket 12 that guides a belt, through which a seat belt is inserted, may be attached to the upper portion of the frame 6 of the seat back 2. In this case, the portion, that is folded toward the lower side with respect to the lower protection portion 16, and that is positioned on the rear side of the vehicle (a left end side in FIG. 7A), of the upper protection portion 17 of the airbag 3, is positioned on the lower side of the bracket 12 when the airbag 3 is deployed and inflated.

Here, the fold L3, which is used when the lower end portion of the portion, that is folded toward the lower side with respect to the lower protection portion 16, of the upper protection portion 17, is folded back toward the upper side, is inclined so as to be positioned on the lower side of the vehicle toward the front side of the vehicle (the right side in FIG. 7A). Therefore, when the upper protection portion 17 rotates (is deployed) toward the upper side about the upper end portion of the lower protection portion 16 in accordance with inflation of the lower protection portion 16, the rotation trajectory is smaller toward the portion of the upper protection portion 17 on the rear side of the vehicle (a left end side in FIG. 7A).

Accordingly, when the upper protection portion 17 rotates as described above in accordance with inflation of the lower protection portion 16, the portion of the upper protection portion 17 on the rear side of the vehicle can be prevented from interfering with the bracket 12 on the frame 6 of the seat back 2 during the above-described rotation.

(4) As shown in FIG. 16, when the portion, that is positioned on the inner side in the width direction of the vehicle (the upper side in FIG. 16) than the lower protection portion 16, of the upper protection portion 17 of the airbag 3, is drawn toward the front side (the right side in FIG. 16) from between the lower protection portion 16 and the seat back 2 due to inflation of the lower protection portion 16, the above-described portion tends to rotate (to be deployed) toward the front side about the front end of the lower protection portion 16.

Since the above-described portion of the upper protection portion 17 is folded back toward the front side (the right side in FIG. 16) on the portion positioned on the rear side of the vehicle (the left side of the vehicle) as described above, the width of the above-described portion in the front-rear direction can be reduced. Therefore, the rotation trajectory when the above-described portion rotates as described above is kept small Incidentally, as shown in FIG. 10B, when the portion, that is positioned on the inner side in the width direction of the vehicle (the upper side in FIG. 10B) than the lower protection portion 16, of the upper protection portion 17 of the airbag 3, is rotated as described above in a state in which the portion is not folded back toward the front side of the vehicle, the rotation trajectory at that time is enlarged as shown by a two-dot chain line in FIG. 10B. On the other hand, as in the present embodiment, in a case in which the portion, that is positioned on the inner side in the width direction of the vehicle (the lower side in FIG. 12B) than the lower protection portion 16, of the upper protection portion 17 of the airbag 3, is folded back toward the front side, the rotation trajectory of the portion at the time of such rotation is kept small as shown by a two-dot chain line in FIG. 12B.

Therefore, when the portion, that is on the inner side in the width direction of the vehicle than the lower protection portion 16, of the upper protection portion 17 of the airbag 3, is drawn toward the front side from between the lower protection portion 16 and the body side portion 11 due to inflation of the lower protection portion 16, the action can be performed easily.

(5) In the side airbag apparatus, the airbag 3 is folded so as to have a reduced width in the front-rear direction by folding the airbag 3 into the flat roll shape from the front side to the rear side of the vehicle. Further, as shown in FIG. 3, the airbag 3 is housed inside the seat back 2 in a manner that the portion of the airbag 3 folded into the flat roll shape becomes thinner in the width direction of the vehicle (the upper-lower direction in FIG. 2). Therefore, even when a space SP (FIG. 2) for housing the folded airbag 3 cannot be large in the width direction of the vehicle in the seat back 2, the airbag 3 can be housed in the space SP.

The above embodiment may be modified as follows, for example.

When the airbag 3 is housed inside the seat back 2, the airbag 3 does not need to be housed inside the seat back 2 in a manner that the portion of the airbag 3 folded into the flat roll shape becomes thinner in the width direction of the vehicle.

In order to reduce the width of the airbag 3 in the front-rear direction of the vehicle, the airbag 3 is folded into the flat roll shape and folded in the bellows-shaped manner, but may also be applied with only one of the folding methods. Further, when the airbag 3 is folded into the roll shape, the airbag 3 does not always need to be flat.

The procedure 5 may be omitted when the airbag 3 is folded, and the folded airbag 3 may be housed in the seat back 2 with the procedure 5 omitted in this way.

In the procedure 3 when the airbag 3 is folded, the fold L3 does not always need to be inclined as in the embodiment described above. For example, the inclination angle of the fold L3 with respect to the horizontal plane may be changed, or the fold L3 can be made horizontal.

The procedure 3 may be omitted when the airbag 3 is folded, and the folded airbag 3 may be housed in the seat back 2 with the procedure 3 omitted in this way.

The procedure 4 may be omitted when the airbag 3 is folded, and the folded airbag 3 may be housed in the seat back 2 with the procedure 4 omitted in this way.

According to an aspect of the invention, there is provided a side airbag apparatus comprising: a side airbag housed in a seat back of a seat of a vehicle in a state such that the side airbag is folded to have a reduced width in a front-rear direction of the vehicle, the side airbag configured to, when supplied with gas, be deployed and inflated toward a front side of the vehicle between an occupant seated on the seat and a body side portion of the vehicle, wherein the side airbag includes: a lower protection portion configured to protect a portion below a head portion of the occupant when the side airbag is deployed and inflated; and an upper protection portion positioned above the lower protection portion, protruding toward the front side of the vehicle than the lower protection portion, and configured to protect the head portion of the occupant, when the side airbag is deployed and inflated, and wherein the side airbag is folded so as to have the reduced width in the front-rear direction of the vehicle and housed in the seat back, in a state in which the upper protection portion is folded toward a lower side so as to be positioned on an outer side in a width direction of the vehicle with respect to the lower protection portion, and a portion, that protrudes toward the front side of the vehicle with respect to the lower protection portion, of the upper protection portion folded toward the lower side, is folded toward a rear side of the vehicle so as to be positioned on an inner side in the width direction of the vehicle with respect to the lower protection portion.

According to the above-described configuration, when the side airbag housed in the seat back is deployed and inflated, the portion, that is folded so as to have the reduced width in the front-rear direction of the vehicle, of the side airbag, extends in the front-rear direction of the vehicle in an initial stage of the deployment and inflation. Thereafter, when the lower protection portion of the side airbag is inflated, the upper protection portion, which is positioned so as to wrap around the lower protection portion in a horizontal direction from an outer side to an inner side of the lower protection in the width direction of the vehicle, is pressed against the body side portion of the vehicle and the seat back of the seat between the body side portion and the seat back by the inflated lower protection portion.

However, at this time, in accordance with inflation of the lower protection portion, a portion, that is positioned on the outer side in the width direction of the vehicle than the lower protection portion, of the upper protection portion, draws a portion, that is positioned on the inner side in the width direction of the vehicle than the lower protection portion, of the upper protection portion, in a direction drawing out from between the lower protection portion and the seat back. Thus, the portion, that is positioned on the inner side in the width direction of the vehicle than the lower protection portion, of the upper protection portion, is drawn toward the front side from between the lower protection portion and the seat back. Therefore, the portion, that is positioned on the inner side in the width direction of the vehicle than the lower protection portion, of the upper protection portion, does not become incapable of being deployed and inflated due to being pressed against the seat back by the lower protection portion. Thereafter, the portion, that is positioned on the outer side in the width direction of the vehicle than the lower protection portion, of the upper protection portion, is drawn toward the upper side from between the lower protection portion and the body side portion due to inflation of the lower protection portion. Therefore, the portion, that is positioned on the outer side in the width direction of the vehicle than the lower protection portion, of the upper protection portion, does not become incapable of being deployed and inflated due to being pressed against the body side portion by the lower protection portion.

As described above, when the side airbag is deployed and inflated, even if the upper protection portion is pressed against the seat back and the body side portion by the inflated lower protection portion, the upper protection portion does not become incapable of being deployed. Therefore, the lower protection portion and the upper protection portion of the side airbag can be appropriately deployed and inflated, the head portion of the occupant seated on the seat can be protected by the upper protection portion of the side airbag, and the portion below the head portion of the occupant can be protected by the lower protection portion of the side airbag.

In the above-described side airbag apparatus, it is conceivable that the upper protection portion of the side airbag is folded back toward an upper side, so that a lower end portion of a portion of the upper protection portion, that is folded toward the lower side so as to be positioned on the outer side in the width direction of the vehicle with respect to the lower protection portion, does not protrude toward the upper side from an upper end portion of the lower protection portion. Further, the side airbag is folded so as to have the reduced width in the front-rear direction of the vehicle and housed in the seat back, in a state in which the portion, that protrudes toward the front side of the vehicle with respect to the lower protection portion, of the upper protection portion folded back toward the upper side, is folded toward the rear side of the vehicle so as to be positioned on the inner side in the width direction of the vehicle with respect to the lower protection portion.

According to the above-described configuration, when the portion, that is positioned on the outer side in the width direction of the vehicle than the lower protection portion, of the upper protection portion of the side airbag, is drawn toward the upper side from between the lower protection portion and the body side portion due to inflation of the lower protection portion, the upper protection portion tends to rotate (to be deployed) toward the upper side about a fold between the upper protection portion and the lower protection portion (the upper end portion of the lower protection portion). Since the upper protection portion is folded toward the lower side and folded back toward the upper side as described above, a width of the upper protection portion in an upper-lower direction can be reduced, and a rotation trajectory when the upper protection portion rotates as described above is kept small. Therefore, when the portion, that is positioned on the outer side in the width direction of the vehicle than the lower protection portion, of the upper protection portion of the side airbag, is drawn toward the upper side from between the lower protection portion and the body side portion due to inflation of the lower protection portion, the action can be performed easily.

In the above-described side airbag apparatus, it is conceivable that the lower end portion of the portion, that is folded toward the lower side so as to be positioned on the outer side in the width direction of the vehicle with respect to the lower protection portion, of the upper protection portion of the side airbag, is configured to be folded back toward the upper side along a fold, that is inclined with respect to a horizontal plane so as to be positioned on a lower side of the vehicle toward the front side of the vehicle.

In the vehicle seat, a bracket that guides a belt, through which a seat belt is inserted, may be attached to an upper portion of a frame of the seat back. In this case, the portion, that is folded toward the lower side with respect to the lower protection portion, and that is positioned on the rear side of the vehicle, of the upper protection portion of the side airbag, is positioned on the lower side of the bracket when the side airbag is deployed and inflated. According to the above-described configuration, the fold, which is used when the lower end portion of the portion, that is folded toward the lower side with respect to the lower protection portion, of the upper protection portion, is folded back toward the upper side, is inclined as described above. Therefore, when the upper protection portion rotates (is deployed) toward the upper side about a border portion between the upper protection portion and the lower protection portion (the upper end portion of the lower protection portion) in accordance with inflation of the lower protection portion, the rotation trajectory is smaller toward the portion of the upper protection portion on the rear side of the vehicle. Accordingly, when the upper protection portion rotates as described above in accordance with inflation of the lower protection portion, the portion of the upper protection portion on the rear side of the vehicle can be prevented from interfering with the bracket on the frame of the seat back during the above-described rotation.

In the above-described side airbag apparatus, it is conceivable that a portion, that is folded toward the lower side so as to be positioned on the outer side in the width direction of the vehicle with respect to the lower protection portion, and that protrudes toward the front side of the vehicle with respect to the lower protection portion, of the upper protection portion of the side airbag, is folded toward the rear side of the vehicle so as to be positioned on the inner side in the width direction of the vehicle with respect to the lower protection portion. Further, the side airbag is folded so as to have a reduced width in the front-rear direction of the vehicle and housed in the seat back, in a state in which a rear end portion of a portion, that is folded toward the rear side, of the upper protection portion, is folded back toward the front side so as not to protrude from a front end of the lower protection portion.

According to the above-described configuration, when the portion, that is positioned on the inner side in the width direction of the vehicle than the lower protection portion, of the upper protection portion of the side airbag, is drawn toward the front side from between the lower protection portion and the seat back due to inflation of the lower protection portion, the above-described portion tends to rotate (to be deployed) toward the front side about the front end of the lower protection portion. Since the above-described portion is folded toward the rear side and folded back toward the front side as described above, a width of the above-described portion in the front-rear direction can be reduced. Therefore, a rotation trajectory when the above-described portion rotates as described above is kept small. Therefore, when the above-described portion is drawn toward the front side from between the lower protection portion and the body side portion due to inflation of the lower protection portion, the action can be performed easily.

In the above-described airbag apparatus, it is conceivable that the side airbag is folded into a flat roll shape from the front side to the rear side of the vehicle, so as to have the reduced width in the front-rear direction. Further, the side airbag is housed in the seat back in a manner that a portion of the side airbag folded into the flat roll shape becomes thinner in a width direction of the vehicle.

According to the above-described configuration, even when a space for housing the folded side airbag cannot be large in the width direction of the vehicle in the seat back, the side airbag can be housed in the space.

According to the present invention, a side airbag, which includes an upper protection portion for protecting a head portion of an occupant seated on a seat, is preferably deployed and inflated.

What is claimed is:

1. A side airbag apparatus comprising:
a side airbag housed in a seat back of a seat of a vehicle in a state such that the side airbag is folded to have a reduced width in a front-rear direction of the vehicle, the side airbag configured to, when supplied with gas, be deployed and inflated toward a front side of the vehicle between an occupant seated on the seat and a body side portion of the vehicle,
wherein the side airbag includes:
a lower protection portion configured to protect a portion below a head portion of the occupant when the side airbag is deployed and inflated; and
an upper protection portion positioned above the lower protection portion, protruding toward the front side of the vehicle than the lower protection portion, and configured to protect the head portion of the occupant, when the side airbag is deployed and inflated, and
wherein the side airbag is folded so as to have the reduced width in the front-rear direction of the vehicle and housed in the seat back, in a state in which the upper protection portion is folded toward a lower side so as to be positioned on an outer side in a width direction of the vehicle with respect to the lower protection portion, and a portion, that protrudes toward the front side of the vehicle with respect to the lower protection portion, of the upper protection portion folded toward the lower side, is folded toward a rear side of the vehicle so as to be positioned on an inner side in the width direction of the vehicle with respect to the lower protection portion.

2. The side airbag apparatus according to claim 1,
wherein the upper protection portion of the side airbag is folded back toward an upper side, so that a lower end portion of a portion, that is folded toward the lower side so as to be positioned on the outer side in the width direction of the vehicle with respect to the lower protection portion, of the upper protection portion, does not protrude toward the upper side from an upper end portion of the lower protection portion, and
wherein the side airbag is folded so as to have the reduced width in the front-rear direction of the vehicle and housed in the seat back, in a state in which the portion, that protrudes toward the front side of the vehicle with respect to the lower protection portion, of the upper protection portion folded back toward the upper side, is folded toward the rear side of the vehicle so as to be positioned on the inner side in the width direction of the vehicle with respect to the lower protection portion.

3. The side airbag apparatus according to claim 2,
wherein the lower end portion of the portion, that is folded toward the lower side so as to be positioned on the outer side in the width direction of the vehicle with respect to the lower protection portion, of the upper protection portion of the side airbag, is folded back toward the upper side along a fold, that is inclined with respect to a horizontal plane so as to be positioned on a lower side of the vehicle toward the front side of the vehicle.

4. The side airbag apparatus according to claim 1,
wherein a portion, that is folded toward the lower side so as to be positioned on the outer side in the width direction of the vehicle with respect to the lower protection portion, of the upper protection portion of the side airbag, and that protrudes toward the front side of the vehicle with respect to the lower protection portion, is folded toward the rear side of the vehicle so as to be positioned on the inner side in the width direction of the vehicle with respect to the lower protection portion, and
wherein the side airbag is folded so as to have the reduced width in the front-rear direction of the vehicle and housed in the seat back, in a state in which a rear end portion of a portion, that is folded toward the rear side, of the upper protection portion, is folded back toward the front side so as not to protrude from a front end of the lower protection portion.

5. The side airbag apparatus according to claim 1,
wherein the side airbag is folded into a flat roll shape from the front side to the rear side of the vehicle, so as to have the reduced width in the front-rear direction, and
wherein the side airbag is housed in the seat back in a manner that a portion of the side airbag folded into the flat roll shape becomes thinner in a width direction of the vehicle.

* * * * *